United States Patent [19]
Chonekar et al.

[11] 3,910,892
[45] Oct. 7, 1975

[54] BENZODIOXANE DERIVATIVES

[75] Inventors: Madhukar Subraya Chonekar, Basel; Albert Pfiffner, Pfaffhausen; Norbert Rigassi, Arlesheim; Ulrich Schwieter, Reinach; Milos Suchy, Pfaffhausen, all of Switzerland

[73] Assignee: Hoffmann-La Roche Inc., Nutley, N.J.

[22] Filed: Apr. 3, 1974

[21] Appl. No.: 457,516

Related U.S. Application Data

[62] Division of Ser. No. 235,000, March 15, 1972, Pat. No. 3,819,655.

[30] Foreign Application Priority Data

Mar. 23, 1971  Switzerland.......................... 4258/71

[52] U.S. Cl.......................... 260/240 R; 260/340.3
[51] Int. Cl.²........................................ C07D 319/20
[58] Field of Search...................... 260/340.3, 240 R

[56]  References Cited
UNITED STATES PATENTS

| | | | |
|---|---|---|---|
| 3,704,258 | 11/1972 | Henrick et al. | 260/340.5 |
| 3,711,516 | 1/1973 | Siddall | 260/340.5 |
| 3,787,443 | 1/1974 | Erickson | 260/340.5 X |
| 3,839,562 | 10/1974 | Chodnekar et al. | 424/282 X |

FOREIGN PATENTS OR APPLICATIONS 2,115,673  3/1971  Germany.......................... 260/340.3

OTHER PUBLICATIONS

Chodnekar, et al. II, C.A. 74:87618g, (1971).

*Primary Examiner*—Anton H. Sutto
*Assistant Examiner*—Michael Shippen
*Attorney, Agent, or Firm*—Samuel L. Welt; Jon S. Saxe; William H. Epstein

[57]  ABSTRACT

2-{[(alkenyl, alkynyl or alkyl)oxy]methyl}-1,4-benzodioxane derivatives, useful as insect hormonal agents and insecticide compositions containing these derivatives alone or in combination with conventional insect poisons.

11 Claims, No Drawings

BENZODIOXANE DERIVATIVES

CROSS REFERENCE TO RELATED APPLICATIONS

This application is a division of U.S. Pat. application Ser. No. 235,000 filed Mar. 15, 1972, now U.S. Pat. No. 3,819,655 June 25, 1974.

BACKGROUND OF THE INVENTION

Many conventional insect-poisons, such as the carbamates, the pyrethrins and the chlorinated hydrocarbons, although highly lethal to numerous insects, cannot be used indiscriminately. Despite their value for protecting materials such as foodstuffs, feeds, textiles and plants, these insect-poisons tend to remain indefinitely in the environment after being used. They are not naturally degraded, and by remaining undegraded in the environment, their lingering residues tend to find their way into foods intended for human or cattle consumption. Moreover, because apparently many of these insect-poisons are not quantitatively degraded by mammalian organisms, their use can lead to the indirect injury of humans or other mammals. Thus, the decision to use many conventional insect-poisons cannot be made without some significant reservations. There has been a need therefore, for effective insect-poison compositions having a reduced tendency to linger in the environment, to contaminate food and to resist degradation in mammals.

SUMMARY OF THE INVENTION

In accordance with this invention, it has been found that compounds of the formula:

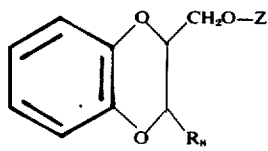

wherein $R_N$ is hydrogen or lower alkyl; Z is:

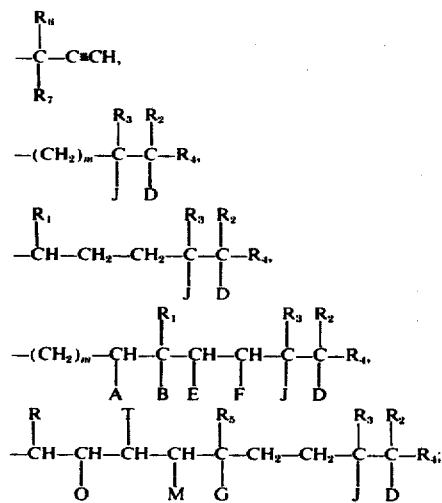

or

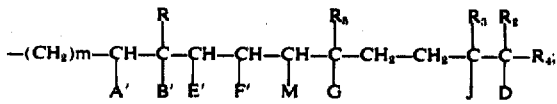

$R$, $R_1$, $R_3$, $R_6$ and $R_7$ are hydrogen or lower alkyl; $R_2$, $R_4$ and $R_5$ are lower alkyl; A is hydrogen; B is hydrogen, lower alkoxy or taken together with A form a carbon to carbon bond or an oxygen bridge; D is hydrogen, lower alkyl, hydroxy, lower alkoxy, lower alkenyloxy, lower alkynyloxy or lower alkanoyloxy, J is hydrogen or taken together with D form a carbon to carbon bond or an oxygen bridge; E and F are hydrogen or when A and B taken together form a carbon to carbon bond, E and F are individually hydrogen or taken together form a carbon to carbon bond; M, T, and Q are individually hydrogen; G is individually hydrogen or lower alkoxy with M taken together with G, and Q taken together with T forming a carbon to carbon bond; A' and B' are individually hydrogen or taken together form a carbon to carbon bond; E' and F' are hydrogen or when A' and B' taken together form a carbon to carbon bond; E' and F' are individually hydrogen or taken together form a carbon to carbon bond; and m is an integer from 1 to 2;

are useful in upsetting the hormone balance of pests to prevent them from growing and reproducing.

In accordance with another embodiment of this invention, it has been found that in compositions which contain the compound of formula I in combination with conventional insecticides such as carbamates, pyrethrins, chlorinated hydrocarbons or phosphoric acid or thio-phosphoric acid esters, the activity of these insecticides is increased by a factor of two to ten and more and the composition has additional juvenile hormone-like activity including ovicidal and/or sterilant activity. Therefore, it is possible to achieve the same degree of insecticidal activity with 10 percent to about 50 percent by weight of the previously used amount of customary insecticides thereby reducing the residue of these insecticides to a tolerable degree.

Moreover, the aforementioned composition containing compound of formula I and the insecticide possess an additional advantage by the fact that after the abatement of the insecticidal action, the juvenile hormone action of the composition comes to the fore so that the sequence of generations is interrupted and the pests are indirectly killed. The benzodioxane derivatives of formula I have juvenile hormone like activity so as to interfere with the hormonal system of the pest organism. With insects, for example, the transformation to the imago, the laying of eggs capable of development and the developing of laid normal eggs is disturbed. These benzodioxane derivatives are practically non-poisonous to vertebrate animals. Their toxicity lies at about over 1,000 mg./kg. body weight and they are, moreover, readily degraded. The risk of accumulation is therefore excluded.

DETAILED DESCRIPTION OF THE INVENTION

As used throughout the application, the term "lower alkyl" comprehends both straight and branched chain saturated hydrocarbon groups containing from 1 to 6 carbon atoms such as methyl, ethyl, propyl, isopropyl, etc. The term "lower alkoxy" comprehends lower alkoxy groups containing from 1 to 6 carbon atoms such as methoxy, propoxy, ethoxy, etc., preferably methoxy. The term "halogen" as used throughout the application includes all four halogens, i.e., bromine, chlorine, fluorine and iodine. The term "lower alkanoyl" includes lower alkanoyl groups containing from 1 to 6 carbon atoms such as acetyl, propionyl, formyl, butyryl, etc. The terms "lower alkenyl" and "lower alkynyl" includes both straight chain and branched chain hydrocarbon groups containing from 2 to 6 carbon atoms such as vinyl, allyl, butenyl, pentenyl, ethynyl, propargyl, butynyl, etc.

Compounds of formula I above and compositions containing these compounds alone or in admixture with other insecticides can be employed against the pests themselves according to the usual methods such as, for example, by means of contact or by intake with the food. The pest-control agents are active against arthropodes and nematodes, especially against various kinds of insects. For example, they are active against Diptera such as house flies, fruit flies (Drosophila melanogaster), midges, stable flies, Lepidoptera such as, for example, cabbage looper (Trichoplusia ni), bus moth, lazy bombyx, owlet moth, owlet caterpillar, etc., or Coleoptera such as alfalfa weevils (Hypera postica), confused flour beetles (Tribolium confusum), aphids, Colorado beetles, spider-mites, Prodenia litura, etc.

In contrast to most of the known pest-control agents which kill, disable or repel the pests by acting as contact-poisons and feed-poisons, the compound of formula I above prevents maturation and proliferation of these pests by interfering with their hormonal system. In insects, for example, the transformation into the imago, the laying of eggs capable of development and the development of laid normal eggs, is disturbed. Furthermore, the sequence of generations is interrupted and the insects are indirectly killed.

The compounds of formula I above are practically non-toxic to vertebrates. The toxicity of these compounds is greater than 1,000 mg./kg. body weight. Moreover, these compounds are readily degraded and the risk of accumulation is therefore excluded. Therefore, these compounds can be used without fear of danger in the control of pests in animals; plants; foods; and textiles.

Generally, in controlling invertebrate animals, the compounds of formula I above thereof are applied such as by spray to the material to be protected, e.g., foodstuffs, feeds, textiles, plants in an amount of from about 0.01 percent to 0.5 percent by weight of the material to be protected. Generally, it is preferred to utilize the compounds of formula I above in a composition with a suitable inert carrier. Any conventional inert carrier can be utilized. The composition which contains an effective amount of the compounds of formula I above should be applied to the material to be protected to provide a concentration of from about 0.01 percent to 0.1 percent of the compound of formula I above on said material. In controlling insects, it is generally preferred to apply from about $10^{-3}$ to about $10^{-6}$ grams of the compound of formula I per $cm^2$ of the surface of the material to be protected.

The compound of formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

Examples of preferred benzodioxane derivatives of formula I having juvenile hormone-like activity and the aforementioned synergistic properties are:

2-[(2-propynyloxy)methyl]-1,4-benzodioxane;
2-{[(3,7-dimethyl-2,6-octadienyl)oxy]methyl}-1,4-benzodioxane;
2-{[(3,7-dimethyloctyl)oxy]methyl}-1,4-benzodioxane;
2-{[(6,7-epoxy-3,7-dimethyl-2-octenyl)oxy]methyl}-1,4-benzodioxane;
2-{[(6,7-epoxy-3-ethyl-7-methyl-2-nonenyl)oxy]methyl}-1,4-benzodioxane;
2-{[(3,7-dimethyl-2,4-octadienyl)oxy]methyl}-1,4-benzodioxane;
2-{[(4-methyl-3-hexenyl)oxy]methyl}-1,4-benzodioxane;
2-{[(3,7-dimethyl-7-methoxy-2,4-octadienyl)oxy]methyl}-1,4-benzodioxane;
2-{[(3,6,7-trimethyloctyl)oxy]methyl}-1,4-benzodioxane;
2-{[(3,7-dimethyl-7-hydroxyoctyl)oxy]methyl}-1,4-benzodioxane;
2-{[(3,7-dimethyl-7-propynyloxyoctyl)oxy]methyl}-1,4-benzodioxane;
2-{[(7-methyl-2,6-octadienyl)oxy]methyl}-1,4-benzodioxane;
2-{[(3,7,7-trimethyl-2,4-octadienyl)oxy]methyl}-1,4-benzoxioxane;
2-{[(3,7,7-trimethyl-2-octenyl)oxy]methyl}-1,4-benzodioxane; 2-{[(3,7,11-trimethyl-11-methoxy-2,4-dodecadienyl)oxy]-methyl}-1,4-benzodioxane;
2-{[(3,7,11-trimethyl-2,4-dodecatrienyl)oxy]methyl}-1,4-benzodioxane;
2-{[(3,7,11-trimethyl-2,6,10-dodecatrienyl)oxy]methyl}-1,4-benzodioxane;
2-{[(3,7,11-trimethyldodecyl)oxy]methyl}-1,4-benzodioxane;
2-{[(10,11-epoxy-3,7,11-trimethyl-2,6-dodecadienyl)-oxy]methyl}-1,4-benzodioxane;
3-methyl-2-[(2-propynyloxy)methyl]-1,4-benzodioxane;
2-{[(3,7-dimethyl-2,6-nonadienyl)oxy]methyl}-1,4-benzodioxane;
2-{[(6,7-epoxy-3,7-dimethyl-2-nonenyl)oxy]methyl}-1,4-benzodioxane;
2-{[(3,7-dimethylnonenyl)oxy]methyl}-1,4-benzodioxane;
2-{[(3,7-dimethyl-2,6-nonadienyl)oxy]methyl}-3-methyl-1,4-benzodioxane;
2-{[(6,7-epoxy-3,7-dimethyl-2-nonenyl)oxy]methyl}-3-methyl-1,4-benzodioxane;
2-{[(3,7-dimethylnonyl)oxy]methyl}-3-methyl-1,4-benzodioxane;
2-{[(3,6,7-trimethyl-2,6-octadienyl)oxy]methyl}-1,4-benzodioxane;
2-{[(6,7-epoxy-3,6,7-trimethyl-2-octenyl)oxy]methyl}-1,4-benzodioxane;
2-{[(3,6,7-trimethyloctyl)oxy]methyl}-1,4-benzodioxane;
2-{[(6,7-epoxy-7-methyl-2-octenyl)oxy]methyl}-1,4-benzodioxane; and
2-{[(1,5-dimethyl-4-hexenyl)oxy]methyl}-1,4-benzodioxane.

Preferred customary insecticides which, for example are synergized by benzodioxane derivatives of formula I are:

1-naphthyl-methylcarbamate (Sevin);
[m-(1-methylbutyl)-phenyl]-methylcarbamate;
[m-(1-ethyl-propyl)-phenyl]-methylcarbamate;
(3-methyl-5-isopropyl-phenyl)-methylcarbamate;
[m-{[(dimethylamino)-methylene]-amino}-phenyl]-methylcarbamate;
(1-dimethylcarbamoyl-5-methyl-3-pyrazolyl)-dimethyl-carbamate;
pyrethrum (pyrethrin I, pyrethrin II, cinerin I, cinerin II, jasmolin II);
2,2-dimethyl-3-(2-methylpropenyl)-cyclopropanecarboxylic acid 1-cyclohexene-1,2-dicarboximidomethyl ester;
2,2-dimethyl-3-(2-methylpropenyl)-cyclopropanecarboxylic acid 5-benzyl-3-furylmethyl ester;
2-allyl-4-hydroxy-3-methyl-2-cyclopenten-1-one esterified with a mixture of cis and trans 2,2-dimethyl-3-(2-methylpropenyl)cyclopropanecarboxylic acid (allethrin);
1,2,3,4,10,10-hexachloro-1,4,4a,5,8,8a-hexahydro-1,4-endo-exo-5,8-dimethano-naphthalene;
octachloro-camphor;
1,1,1-trichloro-2,2-bis-(p-chlorophenyl)-ethane;
1,2,3,4,10,10-hexachloro-6,7-epoxy-1,4,4a,5,6,7,8,8a-octahydro-1,4-endo-endo-5,8-dimethano-naphthalene;
1,2,3,5,6,7,8,8-octachloro-2,3,3a,4,7,7a-hexahydro-4,7-methano-indene;
1,4,5,6,7,8,8-heptachloro-3a,4,7,7a-tetrahydro-4,7-endo-methano-indene;
1,1,1-trichloro-2,2-bis-(p-methoxyphenyl)-ethane (methoxychlor);
hexachloro-cyclohexane;
1,2,3,4,10,10-hexachloro-6,7-epoxy-1,4,4a,5,6,7,8a-octahydro-1,4-endo-exo-5,8-dimethano-napthalene;
1,1,1-trichloro-2,2-bis-(p-chlorophenyl)-ethanol (Kelthane);
1,1-dichloro-2,2-bis-(p-ethylphenyl)-ethane;
1,1-dichloro-2,2-bis-(p-chlorophenyl)-ethane;
1,2-dibromo-3-chloro-propane;
1,2-dibromo-ethane;
methyl bromide;
S-[1,2-bis-(carbethoxy)-ethyl]-O,O-dimethyldithiophosphate (Malathion);
O,O-diethyl O(2-isopropyl-4-methyl-6-pyrimidyl) thiophosphate;
O,O-dimethyl O-(p-nitrophenyl) thiophosphate;
O,O-diethyl O-(p-nitrophenyl) thiophosphate;
O,O-dimethyl S-[4-oxo-1,2,3-benzotriazin-3(4H)-ylmethyl] dithiophosphate;
O,O-diethyl S-(2-ethylthio)-ethyl dithiophosphate;
O,O-dimethyl S-(2-ethylthio)-ethyl thiophosphate;
O,O-dimethyl O-(2-ethylthio)-ethyl thiophosphate;
O,O-diethyl S-(2,5-dichlorophenyl-thiomethyl)-dithiophosphate;
O,O-dimethyl S-(N-methylcarbamoyl-methyl)-dithiophosphate;
2-carbomethoxy-1-prop-2-enyl dimethyl phosphate;
1,2-dibromo-2,2-dichloroethyl dimethyl phosphate;
1-chloro-diethylcarbamoyl-1-prop-2-enyl dimethyl-phosphate;
tetraethyl pyrophosphate;
tetra-N-propyl dithio-pyrophosphate;
2,3-p-dioxanedithiol S,S'-bis-(O,O-diethyl-dithiophosphate);
O,O,O',O',-tetraethyl-S,S'-methylene-bis-(dithiophosphate);
O,O-dimethyl (1-hydroxy-2,2,2-trichloroethyl)-phosphonate;
S-{[(p-chlorophenyl)-thio]-methyl}-O,O-diethyldithiophosphate;
O,O-dimethyl O-2,2-dichlorovinyl phosphate;
O,O-dimethyl O-[1-methyl-2-(1-phenyl-carbethoxy)-vinyl]phosphate;
N,N-dimethyl-N'-(2-methyl-4-chlorophenyl)formamidine;
2-(p-tert.butylphenoxy)isopropyl 2-chloroethyl sulfite;
p-chlorophenyl 2,3,5-trichlorophenyl sulfone;
6,7,8,9,10,10-hexachloro-1,5,5a,6,9,9a-hexahydro-6,9-methano-2,4,3-benzodioxathiepine 3-oxide;
N-(1,1,2,2-tetrachloroethyl-sulfinyl)-cyclohex-4-ene-1,2-dicarboximide;
2-dodecanoic acid 2-thiocyanato-ethyl ester;
crotonic acid 2-(1-methyl-heptyl)-4,6-dinitro-phenyl ester;
N-trichloro-methylthio-cyclohex-4-ene-1,2-dicarboximide;
N-trichloro-methylthio-phthalimide;
3,4-methylenedioxy-6-propyl-benzyl butyl diethyl-eneglycol ether; and rotenone.

The proportions of the two active ingredients in the pest-control agents in accordance with the invention can vary within wide limits according to the intended use, the mode of application, the pests to be combatted and other factors. Any ratio of the insect-poison and compound of formula I can be utilized as the active substance. However, it is preferred to use approximately 0.1 to 10 parts by weight of the benzodioxane of formula I to approximately one part by weight of an insect-poison, with about equal parts by weight of an insect-poison, with about equal parts by weight of the two components being especially preferred.

Pest control agents containing the combined insecticide composition in accordance with this invention can be prepared in the form of granulates, concentrates or ready-to-use pest control agents. The concentration of the insecticide composition depends upon the form of pest control agent and the mode of use. The pest-control agents in accordance with this invention can contain solid or liquid inert carrier material to form solutions, sprays, aerosols or dusting powders, as set forth above with respect to the use of the compound of formula I with an inert carrier material.

In general, the pest-control agents utilizing the combined insecticide compositions of the present invention can be prepared according to a process such as is described, for example, in Farm Chemicals, Vol. 128, pages 52 ff. The pest-control agents in accordance with this invention can additionally utilize yet other additives such as emulsifiers or masking agents.

The pest-control agents in accordance with this invention can exist in the form of concentrates which are suitable for storage and transport. Such concentrates can, for example, contain from about 40 to about 80 percent by weight of the synergistically active combination of insect-poison and compound of formula I as the active substance, and from about 60 percent to about 20 percent by weight of an inert carrier material. In preparing these concentrates, any conventional liquid or solid inert carrier material can be utilized. Among the inert carrier materials which can be utilized are the liquid solvents and solid materials mentioned above.

These concentrates can be further diluted with similar or different carrier materials to concentrations which are suitable for practical use as ready-to-use pest-control agents. In the ready-to-use agents, the active substance concentration is preferably 0.1–20 percent by weight of the synergistically active substance, and 99.9–80 percent by weight of an inert carrier material with 0.1–10 percent by weight of the active substance and 99.9–90 percent by weight of the inert carrier being especially preferred. The active substance concentration can also be smaller or larger than the preferred concentration. In preparing these ready-to-use pest-control agents, any conventional liquid or solid inert carrier material may be utilized. Among the inert carrier materials which may be utilized are the liquid and solid materials mentioned above.

According to the process provided by the present invention, the benzodioxane derivatives of formula I are manufactured by:

a. reacting a compound of the general formula:

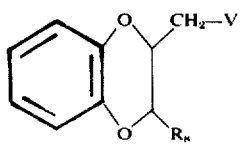   II with a compound of the general formula:

 III wherein $R_N$ and Z are as above; and one of the symbols V and X is chlorine, bromine, iodine or tosyloxy, and the other is -OMe; wherein Me is an alkali metal or an alkaline earth metal;

or b. catalytically hydrogenating a benzodioxane derivative of formula I in which at least one of the pairs of symbols A and B, $A_1$ and $B_1$, $E_1$ and $F_1$, E, F, M and G, Q and T and J and D is a carbon to carbon bond;

or c. epoxidizing a benzodioxane derivative of formula I in which A and B or $A_1$ and $B_1$ and/or J and D is a carbon to carbon bond;

or d. etherifying a benzodioxane derivative of formula I where D is hydroxy;

or e. esterifying a benzodioxane derivative of formula I where D is hydroxy.

The reaction of an alcoholate of formula II with a halide or tosylate of formula III or of an alcoholate of formula III with a halide or tosylate of formula II is carried out in an inert organic solvent, preferably in dimethylformamide, dioxane or hexamethyl phosphoric acid triamide. The alcoholate is conveniently formed in situ from the corresponding alcohol by carrying out the reaction in the presence of an alkali metal or alkaline earth metal, preferably in the presence of sodium or of a corresponding hydride or amide, preferably sodium hydride or sodium amide. The temperature at which the reaction is carried out has no decisive significance and it can expediently lie between −20°C. and the boiling point of the reaction mixture. A preferred reaction temperature is room temperature, (i.e., from 20°C. to 30°C) especially when X in formula III is bromine.

Benzodioxane derivatives of formula I in which at least one of the pairs of symbols A and B, $A_1$ and $B_1$, $E_1$ and $F_1$, E and F, M and G, Q and T and J and D together represent an additional bond can be hydrogenated with catalytically activated hydrogen in an inert organic solvent (e.g., ethyl acetate of methanol) at a temperature between room temperature and the boiling point of the solvent at normal or elevated pressure. Suitable catalysts are, for example, Raney-nickel or noble metals such as, for example, platinum or palladium.

The epoxidation of benzodioxane derivatives of formula I in which A and B or $A_1$ and $B_1$ and/or J and D together represent an additional bond is expediently carried out by dissolving the derivative in question in an inert solvent, especially in a halogenated hydrocarbon such as methylene chloride or chloroform and treating the solution at a temperature between 0°C. and 30°C. with an organic peracid (e.g., perbenzoic acid, m-chloroperbenzoic acid or perphthalic acid) or by suspending the derivative in question in water, treating the suspension with an amount of an inert solvent (e.g., dioxane, tetrahydrofuran or 1,2-dimethoxyethane) such that a homogeneous, concentrated solution results, introducing N-bromosuccinimide portionwise into this solution at a temperature between 0°C. and 30°C. and converting the resulting bromohydrine into the desired epoxide in a smooth manner by the action of an alkali, especially by the action of sodium methylate in methanol.

Benzodioxane derivatives of formula I in which D represents a hydroxy group can be etherified, for example, in the manner described earlier for the compounds of formulae II and III, or esterified by conventional means using a suitable functional derivative of a lower alkane carboxylic acid, preferably an acid halide such as an acid chloride.

Certain of the starting materials of formula III hereinbefore are known. They are prepared by reacting an acetal of the general formula:

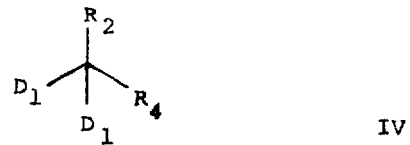   IV wherein $R_2$ and $R_4$ are as above; and $D_1$ is lower alkoxy; with a vinyl ether of the general formula:

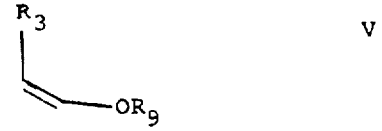   V wherein $R_3$ is hydrogen or lower alkyl; and $R_9$ is lower alkyl.

This reaction is carried out in the presence of a Lewis acid (e.g., boron trifluoride etherate or iron (III) chloride). Advantageously, the reaction is carried out in the absence of a solvent. It is preferred to carry out this reaction at a temperature between 0°C. and room temperature. After approximately 2 hours, the reaction mixture is neutralized with a base, extracted with diethyl ether, the ether extract is dried and evaporated and the residue is distilled. There is thus obtained an acetal of the formula:

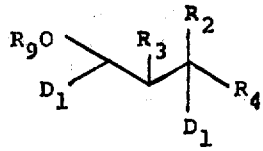   VI wherein $R_2$, $R_3$, $R_4$, $R_9$ and $D_1$ are as above.

An acetal of formula VI is then subjected to acidic hydrolysis in the usual manner (e.g., with 5 percent by weight aqueous phosphoric acid). Conveniently, the hydrolysis is carried out with heating to 60°C. to 100°C. in the presence of a small amount of hydroquinone. After approximately 2 hours, the mixture is made basic and worked up in the manner described earlier in the preparation of formula VI. There is thus obtained an aldehyde of the formula:

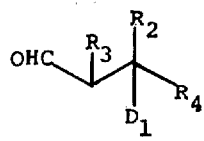   VII wherein $R_2$, $R_3$, $R_4$ and $D_1$ are as above.

An aldehyde of formula VII is then reduced by conventional reduction procedures utilizing a complex metal hydride (e.g., lithium aluminum hydride) in an inert organic solvent (e.g., an ether, preferably diethyl ether, tetrahydrofuran or dioxane) at a temperature between 0°C. and the boiling point of the reaction mixture. There is thus obtained an alcohol of the formula:

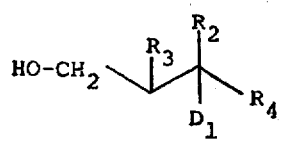   VIII wherein $R_2$, $R_3$, $R_4$, and $D_1$ are as above. An alcohol of formula VIII is converted in a known manner into the desired halide (e.g., with thionyl chloride, phosphorus tribromide, etc.) or into the desired tosylate (e.g., with tosyl chloride).

Certain of the compounds of the formula:

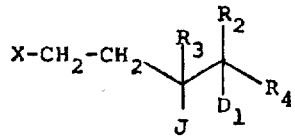   IX wherein $R_2$, $R_3$, $R_4$, J, $D_1$ and X are as above; are known. They are prepared by reacting a compound of the formula:

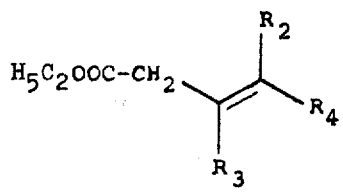   X wherein $R_2$, $R_3$ and $R_4$ are as above; with a lower alkanol in the presence of a mineral acid or by alkoxymercuration followed by demercuration with sodium borohydride as described in J. Am. Chem. Soc. 89, 1522 (1967), reducing the resulting compound of the formula:

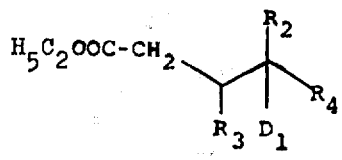   XI wherein $R_2$, $R_3$, $R_4$ and $D_1$ are as above; with lithium aluminum hydride in the manner described hereinbefore in connection with the reduction of an aldehyde of formula VII and then converting the alcohol thus obtained into a halide or a tosylate in the manner described earlier in connection with an alcohol of formula VIII.

The compounds of formula X hereinbefore are obtained by reacting a ketone of the formula:

   XII wherein $R_2$ and $R_4$ are as above; with a compound of the formula:

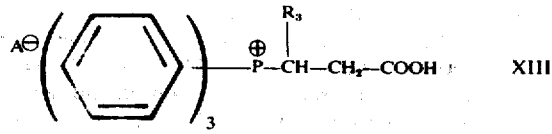   XIII wherein $R_3$ is as above; and A is an anion; in the presence of 2 moles of a base, preferably sodium hydride, in an inert solvent such as tetrahydrofuran/dimethyl sulfoxide under the conditions described in Journ. Amer. Chem. Soc. 86, 1884, (1964) and subsequent esterification.

Aldehydes of the formula:

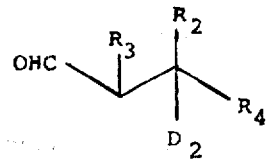   XIV wherein $D_2$ is a lower alkyl; and $R_2$, $R_3$ and $R_4$ are as above; are obtained by reacting a ketone of formula XII with a phosphonate of the formula:

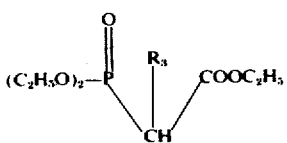

XV wherein R is as above; in the presence of a base, preferably an alcoholate, in an inert solvent while heating. Sodium ethylate is preferably used as the base and ethanol is preferably used as the solvent in order to avoid re-esterification and the formation of a mixture of products. There is thus obtained a compound of the formula:

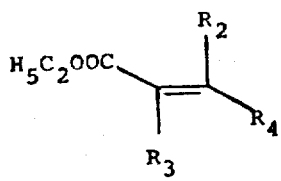

XVI wherein $R_2$, $R_3$ and $R_4$ are as above; which is reacted with a compound of the formula:

IMg-$D_2$

XVII wherein $D_2$ is as above; in the presence of copper (I) chloride to yield an ester of the formula:

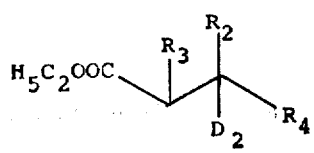

XVIII wherein $R_2$, $R_3$, $R_4$ and $D_2$ are as above. This reaction is carried out, for example, in the manner described in Journ. Amer. Chem. Soc. 63, 2308, (1941). An ester of formula XVIII is reduced with lithium aluminum hydride by conventional procedures to give an alcohol of the formula:

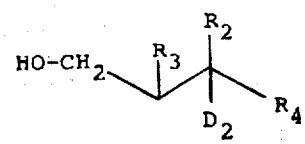

XIX wherein $R_2$, $R_3$, $R_4$ and $D_2$ are as above; and an alcohol of formula XIX is oxidized to an aldehyde of formula XIV using chromium trioxide in pyridine in a known manner.

In order to prepare an alcohol of the formula:

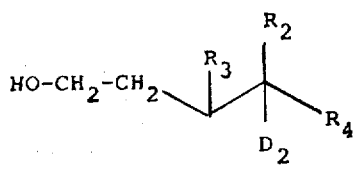

XX wherein $R_2$, $R_3$, $R_4$ and $D_2$ are as above; an ester of formula XVIII is saponified, the resulting acid is converted by well-known procedures into an acid halide and this acid halide is then reacted with diazomethane in the presence of silver oxide in a known manner and thereafter reduced with a metal hydride (e.g., lithium aluminum hydride).

Other valuable intermediates are hydroxyacetals of the formula:

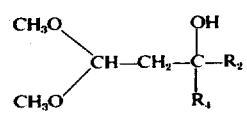

XXI wherein $R_2$ and $R_4$ are as above.

The hydroxyl group in a hydroxyacetal of formula XXI can be etherified with a lower alkyl halide, a lower alkenyl halide, a lower alkynyl halide or a benzyl halide in the manner described earlier in connection with the reaction of a compound of formula II with a compound of formula III. This hydroxyl group can also be esterified in a known manner with a lower alkane carboxylic acid halide.

The hydroxyacetals of formula XXI can readily be obtained according to the methods described in Chem. Abstr. 51, 2854, (1957) from a compound of the formula:

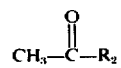

XXII wherein $R_2$ is as above; by reaction thereof with formic acid methyl ester and reaction of the resulting compound of the formula:

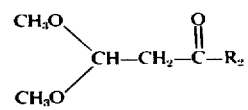

XXIII wherein $R_2$ has the significance given earlier; in a known manner with a compound of the formula:

BrMg-$R_4$

XXIV wherein $R_4$ has the significance given earlier.

Thus, after the optional etherification or esterification of the hydroxyl group of a hydroxyacetal of formula XXI, there is obtained by the acidic hydrolysis of the acetal function an aldehyde of the formula:

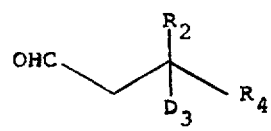

XXV wherein $R_2$ and $R_4$ have the significance given earlier; and $D_3$ represents a hydroxy, lower alkoxy, lower alkenyloxy, lower alkynyloxy or lower alkanoyloxy group or a benzyloxy group which may be substituted in the phenyl ring by lower alkyl, lower alkoxy, methylenedioxy or halogen.

The aldehydes of formulae VII, XIV and XXV can be generically formulated thus:

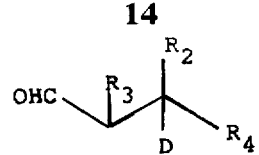

wherein $R_2$, $R_3$, $R_4$ and D are as above.

The alcohol or halide starting materials for forming the side-chain in the benzodioxane derivatives of formula I are prepared from the aldehydes of formula XXVI by means of a Wittig reaction. The basic method for preparing such starting materials is illustrated in the following formula scheme:

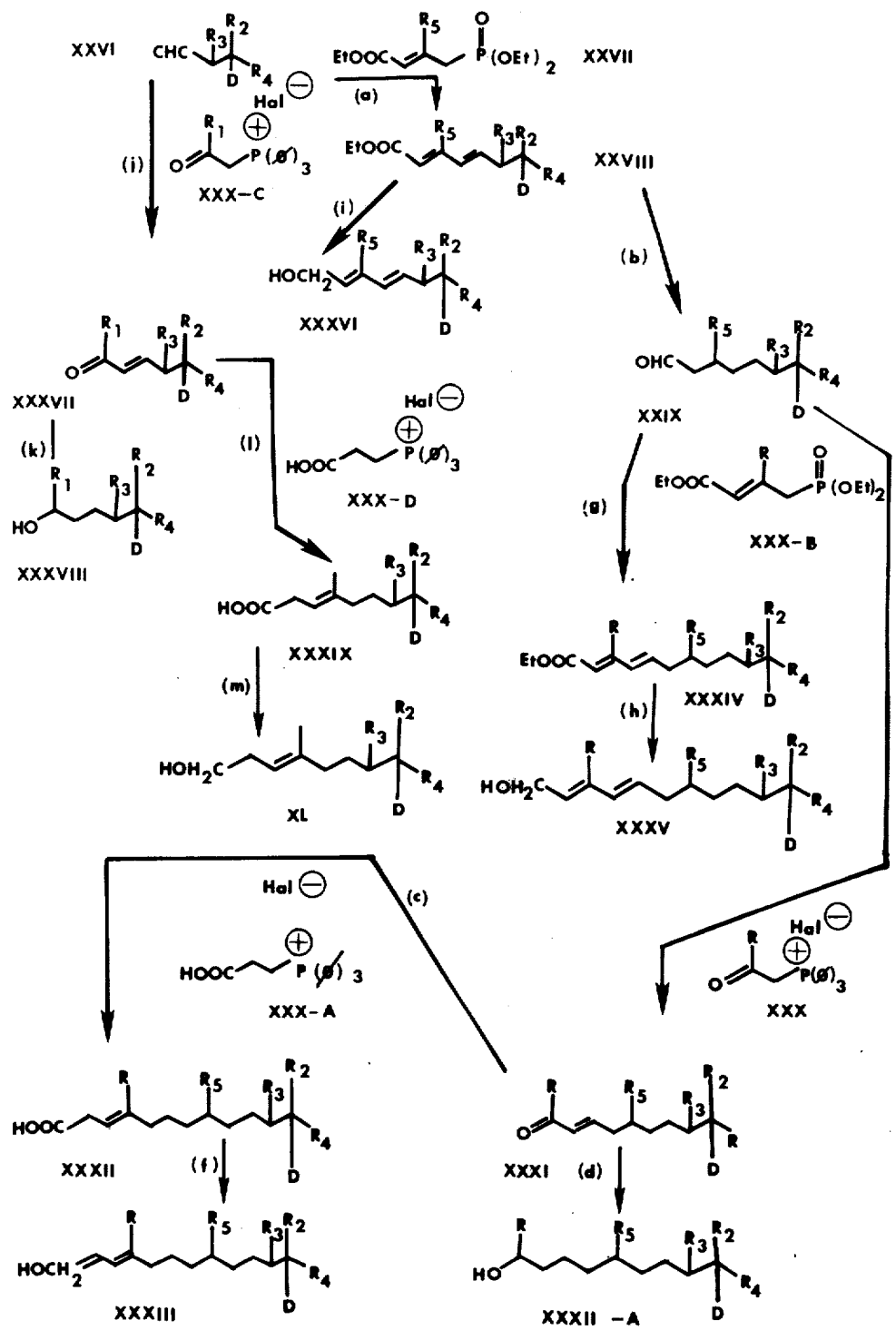

wherein R, $R_1$, $R_2$, $R_3$, $R_4$, $R_5$, and D are as above; and Et is an alkyl group;

The compound of formula XXVI is converted to the compound of formula XXVIII by reaction with the phosphonate of formula XXVII via reaction step (a). The reaction of step (a) is carried out under the same conditions described hereinbefore with respect to reacting the ketone of the formula XII with the phosphonate of the formula XV. The compound of formula XXVIII is converted to the compound of the formula XXIX, via reaction step (b) by first catalytically hydrogenating the compound of the formula XXVIII to reduce the double bond contained therein, then reducing the ester group to an alcohol group by treatment with a complex metal hydride and then oxidizing the alcohol thus produced to an aldehyde using chromium trioxide in pyridine.

The hydrogenation of the first step of reaction step (b) is carried out in the known manner utilizing conventional hydrogenation catalysts such as Raney nickel or noble metals such as platinum or palladium. The saturated ester thus formed is converted via the second step of reaction step (b), to an alcohol by treating with a complex metal hydride. Any of the conventional procedures utilized in reducing with complex metal hydrides such as lithium aluminum hydride can be utilized in carrying out this part of reaction step (b). The alcohol thus formed is oxidized to the aldehyde of formula XXIX using chromium trioxide in pyridine in a known manner.

The compound of formula XXIX is converted to the compound of the formula XXXI, via reaction step (c), by reacting the compound of the formula XXIX with the phosphonium halide of the formula XXX. The same reaction conditions utilized in connection with reaction step (a), can be utilized in carrying out the reaction of step (c). The compound of formula XXXI can be reduced to the alcohol of the formula XXXII-A, via reaction steps (d), by first catalytically hydrogenating the compound of formula XXXI to reduce the double bond contained therein, then reducing the oxo group with a complex metal hydride such as lithium aluminium hydride in the manner described in connection with the conversion of the compound of the formula VII to the compound of the formula VIII.

On the other hand, the compound of the formula XXXI can be converted to the compound of the formula XXXII via reactions step (e) by first catalytically hydrogenating the double bond and then reacting the resulting saturated aldehyde with the phosphonium salt of formula XXX-A. The hydrogenation is carried out catalytically in the manner described hereinbefore utilizing conventional hydrogenation catalysts. The reaction of the saturated aldehyde with the phosphonium salt of formula XXX-A is carried out under standard Wittig conditions as described in the reaction of the ketone of formula XII with the phosphonium salt of formula XIII. The acid of formula XXXII is converted to the alcohol of formula XXXIII via reaction step (f), by reduction with the complex metal hydride such as lithium aluminum hydride. The reaction of step (f) is carried out in the same manner as described in connection with reaction step (d).

On the other hand, the compound of formula XXIX can be converted to the compound of formula XXXV via reaction steps (g) and (h). The reaction of step (g) is carried out by reacting the compound of formula XXIX with a phosphonate of formula XXX-B in the same manner as described in connection with step (a). The reaction of step (h) is carried out by reacting compounds of formula XXXIV with a complex metal hydride such as lithium aluminum hydride utilizing the same reaction conditions set forth in connection with the reaction of step (d).

On the other hand, the compound of formula XXVIII can be converted to the compound of formula XXXVI via reaction step (i). The reaction of step (i) is carried out by treating the compound of the formula XXVIII with a complex metal hydride such as lithium aluminum hydride in the same manner as described in connection with reaction step (d).

The compound of formula XXVI can be converted to the compound of the formula XXXVII via reaction step (j) by reaction with the phosphonium salt of formula XXX-C. This reaction is carried out utilizing standard Wittig procedures such as described in connection with reaction step (c). The compound of formula XXXVII can be converted to the compound of formula XXXVIII via catalytic hydrogenation and reduction with a complex metal hydride such as lithium aluminum hydride. The catalytic hydrogenation and the complex metal hydride reduction is carried out utilizing the same conditions described hereinbefore. On the other hand, the compound of the formula XXXVII can be converted to the compound of the formula XXXIX via reaction step (l) by first catalytically hydrogenating a compound of the formula XXXVII to form the corresponding saturated compound which is then reacted with the phosphonium salt of the formula XXX-D to produce the compound of the formula XXXIX. The catalytic hydrogenation can be carried out in the manner described hereinbefore. Furthermore, the reaction of the hydrogenated product of the compound of the formula XXXVII with the compound of the formula XXX-D can be carried out utilizing standard Wittig techniques such as described hereinbefore. The compound of the formula XXXIX is converted to the compound of the formula XL via reaction step (m) by treating the compound of the formula XXXIX with a complex metal hydride such as lithium aluminum hydride in the manner described hereinbefore.

The alcohol of the formula XXXII-A, XXXIII, XXXV, XXXVI, XXXVIII and XL can be converted to the compound of the formula I by reacting the alcohols with the compound of formula II wherein V is chlorine, bromine, iodine or tosyloxy.

The following examples are illustrative but not limitative of the invention. The ether utilized in these examples was diethyl ether. The temperature in all of these examples is in degrees centigrade.

EXAMPLES 1 – 3

As an example and a particularly preferred example of a benzodioxane derivative of formula I, the following derivative (denoted by A in the Tables) was shosen for chosen 1, 2 and 3 which demonstrate the efficacy of the benzodioxane derivatives provided by the present invention:

A 2-[ (2-propynyloxy)methyl]-1,4-benzodioxane

EXAMPLE 1

Aphids

For each test, one seedling of the field bean having about 50–100 black bean aphids is sprayed with a solution of the active ingredient(s) in acetone or with an aqueous spray-wash. The concentration is given logarithmically in g/cm$^3$ (3 = 10$^{-3}$ g/cm$^3$ = 1 percent o). The seedlings are individually placed in tubes in water. After 24 and 48 hours, the dead and the surviving aphids are counted and the activity calculated in percent.

Table I

| APHIDS | (LD$_{50}$ based on insecticide) | | | | | | | | |
|---|---|---|---|---|---|---|---|---|---|
| | Methoxychlor (I:J.H.) | | | Sevin (I:J.H.) | | | Allethrin (I:J.H.) | | |
| J.H. | 1:5 | 100:0 | 0:100 | 1:5 | 100:0 | 0:100 | 1:5 | 100:0 | 0:100 |
| A | 4.3 | 3.3 | >3.5 | 6.4 | 5.7 | >3.5 | 5.6 | 5.0 | >3.5 |

I = Insecticide.
J.H. = Benzodioxanederivative having juvenile hormone-like activity.

EXAMPLE 2

Flies

For each test, two petri dishes are sprayed with a solution of the active ingredient(s) in acetone or with an aqueous spray-wash. The concentration is given logarithmically in g/cm$^3$. With the concentration 3 (10$^{-3}$ g/cm$^3$ = 1 percent o), the dosage for each treated surface is 10$^{-5}$ g/cm$^2$ = kg/ha. After 2–3 hours, 10 flies aged 4–5 days are placed in each petri dish. After 1,3 and 24 hours, the flies which are dead or crippled are counted.

Table II

| FLIES | (LD$_{50}$ based on insecticide) | | | | | | | | |
|---|---|---|---|---|---|---|---|---|---|
| | Sevin (I:J.H.) | | | Methoxychlor(I:J.H.) | | | Malathion (I:J.H.) | | |
| J.H. | 1:5 | 100:0 | 0:100 | 1:5 | 100:0 | 0:100 | 1:5 | 100:0 | 0:100 |
| A | >5 | 2.5 | >3.5 | 4.6 | 3.8 | >3.5 | 5.3 | 5.1 | >3.5 |

I = Insecticide.
J.H. = Benzodioxane derivative having juvenile hormone-like activity.

EXAMPLE 3

Spider-Mites

For each tests, three bean leaf discs each with a 2-day infection and with 20–40 spider-mites and eggs are sprayed with a solution of the active ingredient(s) in acetone or with an aqueous spray-wash. The concentration is given logarithmically in g/cm$^3$. With the concentration 3 (10$^{-3}$ g/cm$^3$ = 1 percent o), the dosage for each treated surface is 10$^{-5}$ g/cm$^2$ = kg/ha. After two days, the discs are assessed for dead spider-mites and after six days for dead spider mites and killed eggs. (Assessment scheme: from 0–5, where 0 = 0 = percent and 5 = 100 percent mortality).

W = the numbers are based on the mortality of the spider mites;

O = the numbers are based on the mortality of the eggs.

EXAMPLE 4

16.6 g of 2-hydroxymethyl-1,4-benzodioxane are added portionwise to a suspension of 12.5 g of sodium hydride in 75 ml of dimethylformamide. The mixture is stirred for 30 minutes and 11.8 g of propargyl bromide are thereafter added dropwise, the temperature being held below 35°C. The mixture is stirred for a further 3 hours at room temperature and then cooled in an icebath. The excess sodium hydride is destroyed by the careful addition of 30 ml of water. A further 300 ml of water are thereafter added and the mixture is extracted three times with 150 ml of diethyl ether each time. The combined ether extracts are washed neutral with water, dried over sodium sulphate and evaporated. The residue is chromatographed on silica gel using benzene as the eluting agent. 2-[(2-Propynyloxy)methyl]-1,4-benzoioxane is obtained; $n_D^{23}$ = 1.5374.

EXAMPLE 5

By the procedure of Example 4:

2-hydroxymethyl-1,4-benzodioxane and geranyl bromide are reacted to produce 2-/[(3,7-dimethyl-2,6-octadienyl)oxy]-methyl/-1,4-benzodioxane ($n_D^{23}$ = 1.5208);

2-hydroxymethyl-1,4-benzodioxane and 3,7,11-trimethyl-2,6,10-dodecatrienyl bromide are reacted to produce 2-/[(3,7,11-trimethyl-2,6,10-dodecatrienyl)oxy]methyl/-1,4-benzodioxane ($n_D^{24}$ = 1.5206);

2-hydroxymethyl-1,4-benzodioxane and 3,7-dimethyl-2,6-nonadienyl bromide are reacted to produce 2-/[(3,7-dimethyl-2,6-nonadienyl)oxy]methyl/-1,4-benzodioxane (boiling point: 170°–173°C/0.7 mmHg), 2-hydroxymethyl-1,4-benzodioxane and 3,6,7-

Table III

| SPIDER-MITES | (LD$_{50}$ based on insecticide) | | | | | | | | | | | | | | | | | |
|---|---|---|---|---|---|---|---|---|---|---|---|---|---|---|---|---|---|---|
| | Sevin (I:J.H.) | | | | | | Methoxychlor (I:J.H.) | | | | | | Allethrin (I:J.H.) | | | | | |
| J.H. | 1:5 | | | 100:0 | | | 0:100 | | | 1:5 | | | 100:0 | | 0:100 | 1:5 | 100:0 | 0:100 |
| | W | O | W | O | W | O | W | O | W | O | W | O | W | O | W | O | W | O |
| A | 3.3 | | <3 | | <2 | | 3.3 | | <3 | | <2 | | 3.9 | 3.1 | | 3.4 | <3 <2 | <2 |

I = Insecticide.
J.H. = Benzodioxane derivative having juvenile hormone-like activity.

trimethyl-2,6-octadienyl bromide are reacted to produce 2/[(3,6,7-trimethyl-2,6-octadienyl)oxy]methyl/-1,4-benzodioxane ($n_D^{24}$ = 1.5204);

2-hydroxymethyl-3-methyl-1,4-benzodioxane and propargyl bromide are reacted to produce 3-methyl-2-[(2-propynyloxy)methyl]-1,4-benzodioxane (boiling point: 83°–84°C/0.08 mmHg and;

2-hydroxymethyl-3-methyl-1,4-benzodioxane and 3,7-dimethyl-2,6-nonadienyl bromide are reacted to produce 2-/[(3,7-dimethyl-2,6-nonadienyl)oxy]methyl/-3-methyl-1,4-benzodioxane ($n_D^{24}$ = 1.5140).

EXAMPLE 6

15.1 g of 2-/[(3,7-dimethyl-2,6-octadienyl)oxy]methyl/-1,4-benzodioxane, are dissolved in 100 ml of ethyl acetate (with the addition of a small amount of a molecular sieve) and treated with 0.5 g of platinum oxide. The mixture is shaken for about 2 hours with hydrogen gas. After uptake of 2350 ml of hydrogen, the mixture is shaken for a further 1 hour, then the catalyst is filtered off and the filtrate evaporated to dryness. A colorless oil, 2-/[(3,7-dimethyloctyl)oxy]methyl/-1,4-benzodioxane remains behind and is distilled in a high vacuum. Boiling point: 133°–135°C/0.05 mmHg; $n_D^{23}$ = 1.4935.

EXAMPLE 7

By the procedure of Example 6:
2-[[(3,7,11-trimethyl-2,6,10-dodecatrienyl)oxy]methyl]-1,4-benzodioxane is converted to 2-[[(3,7,11-trimethyldodecyl)oxy]methyl]-1,4-benzodioxane (boiling point: 160°–165°C/0.01 mmHg; $n_D^{24}$ = 1.4753);

2-[[(3,7-dimethyl-2,6-nonadienyl)oxy]methyl]-1,4-benzodioxane is converted to 2-[[(3,7-dimethylnonyl)oxy]methyl]-1,4-benzodioxane (boiling point: 155°–158°C/0.6 mmHg);

2-[[(3,7-dimethyl-2,6-nonadienyl)oxy]methyl]-3-methyl-1,4-benzodioxane is converted to 2-[[(3,7-dimethylnonyl)oxy]methyl]-3-methyl-1,4-benzodioxane ($n_D^{26}$ = 1.4883) and;

2-[[(3,6,7-trimethyl-2,6-octadienyl)oxy]methyl]-1,4-benzodioxane is converted to 2-[[(3,6,7-trimethyloctyl)oxy]methyl]-1,4-benzodioxane ($n_D^{24}$ = 1.4955).

EXAMPLE 8

8.7 g of 2-[[(3,7-dimethyl-2,6-octadienyl)oxy]methyl]-1,4-benzodioxane are dissolved in 80 ml of methylene chloride. 6.3 g of m-chloroperbenzoic acid (80 percent by weight) are added portionwise with stirring and while cooling in an icebath (0°C). The mixture is left to stand with stirring at room temperature for 2 hours. It is then diluted with 200 ml of methylene chloride and the solution washed twice with 0.5-N aqueous sodium hydroxide solution and twice with water. The methylene chloride phase is dried over sodium sulphate, filtered and evaporated. There remains behind a light-yellow oil which is chromatographed on 250 g of silica gel. Benzene/diethyl ether (3:1 parts by volume) is used as the eluting agent. Pure 2[[(6,7-epoxy-3,7-dimethyl-2-octenyl)oxy]methyl]-1,4-benzodioxane is obtained: $n_D^{25}$ = 1.5156 ((cis/trans-mixture).

EXAMPLE 9

By the procedure of Example 8:
2[[(3,7,11-trimethyl-2,6,10-dodecatrienyl)oxy]methyl]-1,4-benzodioxane is converted to 2-[[(10,11-epoxy-3,7,11-trimeth-1-2,6-dodecadienyl)oxy]methyl]-1,4-benzodioxane ($n_D^{24}$ = 1.5037);

2-[[(3,7-dimethyl-2,6-nonadienyl)oxy]methyl]-1,4-benzodioxane is converted to 2-[[(6,7-epoxy-3,7-dimethyl-2-nonenyl)oxy]methyl]-1,4-benzodioxane ($n_D^{24}$ = 1.5146);

2-[[(3,7-dimethyl-2,6-nonadienyl)oxy]methyl]-3-methyl-1,4-benzodioxane is converted to 2-[[(6,7-epoxy-3,7-dimethyl-2-nonenyl)-oxy]methyl]-3-methyl-1,4-benzodioxane ($n_D^{26}$ = 1.5108) and;

2-[[(3,6,7-trimethyl-2,6-octadienyl)oxy]methyl]-1,4-benzodioxane is converted to 2-[[(6,7-epoxy-3,6,7-trimethyl-2-octenyl)oxy]methyl]-1,4-benzodioxane ($n_D^{24}$ = 1.5176).

EXAMPLE 10

10 g of m-chloroperbenzoic acid (43.1 percent by weight) are added portionwise with stirring at room temperature to a mixture of 9.8 g of 2-[[(3,7-dimethyl-2,6-octadienyl)oxy]-methyl]-1,4-benzodioxane in 150 ml of chloroform and 6 g of sodium acetate (with 3 mol of water of crystallization). The mixture is stirred for a further 2 hours at room temperature and then washed with water, 10 percent by weight sodium bicarbonate aqeous solution and again with water. The chloroform phase is dried and evaporated. There remains behind a light-yellow oil which is chromatographed on 200 g of silica gel. Benzene/diethyl ether (1:1 parts by volume) is used as the eluting agent. 2-[[(2,6:6,7-diepoxy-3,7-dimethyloctyl)oxy]methyl]-1,4-benzodioxane is obtained; $n_D^{25}$ = 1.5110.

EXAMPLE 11

4.36 g of a 55 percent by weight sodium hydride dispersion in mineral oil are washed twice with hexane, covered with 50 ml of dimethylformamide and added dropwise at room temperature to a solution of 16.6 g of 2-hydroxymethyl-1,4-benzodioxane in 30 ml of dimethylformamide. The mixture is stirred for 1.5 hours at 30°–35°C. 18 g of 4-methyl-3-hexenyl bromide are then added dropwise at 0°–5°C, the resulting mixture is stirred for 24 hours at 55°–60°C and the solution obtained is poured into water, exhaustively extracted with diethyl ether, washed neutral with saturated aqueous sodium chloride solution, dried over sodium sulphate and evaporated. Unreacted 2-hydroxymethyl-1,4-benzodioxane is recovered by crystallization from methylene chloride/hexane. By chromatography of the mother liquor on silica gel using hexane/diethyl ether (9:1 parts by volume) there is obtained pure 2-[[(4-methyl-3-hexenyl)oxy]methyl]-1,4-benzodioxane. A sample boils in a bulb tube at ca 105°–110°C/0.005 mmHg; $n_D^{20}$ = 1.5221.

EXAMPLE 12

565 mg of a 55 percent by weight sodium hydride dispersion in mineral oil are washed twice with hexane, covered with 5 ml of absolute tetrahydrofuran and a solution of 2 g of 3,7-dimethyl-2,4-octadien-1-ol in 2 ml of absolute tetrahydrofuran is subsequently added thereto dropwise with nitrogen-gasification and ice-cooling. The mixture is stirred for 1 hour at room temperature. There are subsequently added dropwise, in succession, a solution of 4.2 g of 2-tosyloxymethyl-1,4-benzodioxane in 5 ml of absolute tetrahydrofuran and 10 ml of hexamethyl phosphoric acid triamide and the mixture is stirred for 5 hours at 55°–60°C. The cooled solution is poured into ice-water, exhaustively extracted with diethyl ether, the combined ether solutions are washed with ice-cold 1-N sodium hydroxide and saturated aqueous sodium chloride solution, dried over sodium sulphate and evaporated. By chromatography on silica gel with hexane/diethyl ether (9:1 parts by volume), there is obtained pure 2-[[(3,7-dimethyl-2,4-octadienyl)oxy]methyl]-1,4-benzodioxane; $n_D^{20} = 1.5318$.

EXAMPLE 13

50 g of p-toluenesulphonyl chloride are added portionwise with ice-cooling to a solution of 43 g of 2-hydroxymethyl-1,4-benzodioxane in 430 ml of pyridine, the mixture is stirred at room temperature for 24 hours, poured into ice-water, stirred for 0.5 hour, exhaustively extracted with diethyl ether, the combined ether extracts are washed in succession with ice-cold 1-N aqueous hydrochloric acid, saturated aqueous sodium bicarbonate solution and water, dried over sodium sulphate and evaporated. By crystallization from ether there is obtained pure 2-tosyloxymethyl-1,4-benzodioxane of melting point 77°–79°C.

EXAMPLE 14

14.5 g of 70 percent by weight solution of sodium dihydrobis(2-methoxy-ethoxy)-aluminate in benzene are added dropwise at 5°–10°C to 9 g of 3,7-dimethyl-2,4-octadienoic acid ethyl ester in 40 ml of absolute benzene and the mixture is stirred at room temperature for 1 hour. The mixture is subsequently diluted with 40 ml of diethyl ether and 200 ml of 2-N aqueous hydrochloric acid are added dropwise. The mixture is then poured into water, exhaustively extracted with diethyl ether, the combined ether phases are washed several times with water, dried over sodium sulphate and evaporated. By distillation there is obtained pure 3,7-dimethyl-2,4-octadien-1-ol of boiling point 107°–109°C/5 mmHg.

EXAMPLE 15

8.0 of 2-hydroxymethyl-1,4-benzodioxane are added portion-wise to a suspension of 2.3 g of sodium hydride (50 percent by weight in mineral oil) in 40 ml of hexamethyl phosphoric acid triamide. The mixture is stirred for 30 minutes and then 11.0 g of 1-bromo-7-methyl-2,6-octadiene are added dropwise, whereby the temperature is maintained at 35°–40°C. The mixture is stirred for a further 3 hours at room temperature and then cooled in an ice-bath. Thereafter, 300 ml of water are added and the mixture is extracted three times with 150 ml of diethyl ether each time. The combined ether extracts are washed neutral with water, dried over sodium sulphate and evaporated. The residue is chromatographed on silica gel using a mixture of hexane/ethyl acetate (1:4 parts by volume) as the eluting agent. There is obtained 2-[[(7-methyl-2,6-octadienyl)oxy]methyl]-1,4-benzodioxane; $n_D^{20} = 1.5213$.

EXAMPLE 16

By the procedure described in Example 15, from 8.3 g of 2-hydroxymethyl-1,4-benzodioxane and 10.8 g of 2-bromo-6-methyl-5-heptene there is obtained 2-[[(1,5-dimethyl-4-hexenyl)oxy]methyl]-1,4-benzodioxane; $n_D^{20} = 1.5073$.

EXAMPLE 17

0.18 g of a 55 percent by weight sodium hydride dispersion in mineral oil are washed three times with absolute tetrahydrofuran under nitrogen and subsequently covered with 4 ml of absolute tetrahydrofuran. The mixture is cooled to 0°C and, with stirring, a solution of 0.66 g of 2-hydroxymethyl-1,4-benzodioxane in 10 ml of absolute tetrahydrofuran is added dropwise. The mixture is stirred for 1 hour at room temperature and again cooled to 0°C prior to the dropwise addition over the course of 10 minutes of a solution of 0.64 g of 1-bromo-3,7,7-trimethyl-2-octene in 10 ml of absolute tetrahydrofuran. Subsequently, the mixture is treated with 8 ml of absolute hexamethylphosphoric acid triamide and left to stir for 4 hours while slowly warming to room temperature. The mixture is then poured into 50 ml of ice-water, extracted three times with 30 ml of diethyl ether each time and the ether extracts are washed with water and saturated sodium chloride solution. After drying over sodium sulphate, the extracts are evaporated and the oily residue is chromatographed on silica gel. Elution with hexane/diethyl ether (98:2 parts by volume) yields 2-/[(3,7,7-trimethyl-2-octenyl)oxy]methyl/-1, 4-benzodioxane which distills in a bulb-tube oven at 135°C/0.03 mmHg; $n_D^{20} = 1.5053$.

EXAMPLE 18

1.70 g of lithium wire are cut into small pieces under an argon atmosphere and added to 40 ml of absolute diethyl ether. Then 10 drops of a solution of 15.1 g of neopentyl bromide in 35 ml of absolute diethyl ether are added thereto with stirring, the mixture is cooled to −10°C and, after the reaction has commenced, the rest of the solution is added dropwise at −10°C over a period of 30 minutes. The temperature is then allowed to rise to +10°C over the course of 2 hours with stirring and then the solution is filtered directly into a dropping funnel through a bed of Celite under an argon atmosphere.

The solution of neopentyl-lithium thus prepared is added at −30°C to a stirred suspension of 9.5 g of copper-(I) iodide in 20 ml of absolute diethyl ether over the course of 15 minutes. After a further 15 minutes, a solution of 2.1 g of methyl vinyl ketone in 10 ml of absolute tetrahydrofuran is allowed to drop into the yellow suspension at −20°C over the course of 30 minutes. The temperature is allowed to rise to 0°C over a period of 30 minutes and then the mixture is poured into a mixture of ice and saturated ammonium chloride solution, stirred well and filtered through Cellit. The filtrate is extracted three times with diethyl ether and the extracts are washed with saturated aqueous sodium chloride solution, dried over sodium sulphate and evaporated at 30°C on a rotary evaporator. The residue is chromatographed on silica gel. Elution with pentane/diethyl ether (95:5) yields 6,6-dimethyl-2-heptanone; boiling point (bulb-tube distillation) 90° C/80 mmHg; $n_D^{20} = 1.4178$.

EXAMPLE 19

3.0 g of 6,6-dimethyl-2-heptanone are dissolved in 40 ml of absolute diethyl ether and treated dropwise over the course of 20 minutes at −10°C to 0°C with 12 ml of a 2-M solution of vinyllithium in tetrahydrofuran. The mixture is stirred for 30 minutes at 0°C, poured into ice-water and neutralized with 2-N aqueous sulphuric acid. The mixture is extracted three times with diethyl ether, the extracts are washed with semi-saturated and saturated aqueous sodium chloride solution and dried over sodium sulphate. The residue obtained after evaporation is chromatographed on silica gel. Elution with hexane/diether ether (85:15 parts by volume) yields 3,7,7-trimethyl-1-octen-3-ol which distills in a bulb-tube oven at 90°C/9 mmHg; $n_D^{20}$ = 1.4428.

EXAMPLE 20

A mixture of 540 mg of phosphorus tribromide and 6 ml of absolute diethyl ether is treated dropwise at −10°C with a solution of 680 mg of 3,7,7-trimethyl-1-octen-3-ol in 4 ml of absolute diethyl ether. The temperature is then allowed to rise to 0°C over the course of 1 hour and the mixture is poured into 10 ml of ice-water. The mixture is extracted three times with diethyl ether and the extracts are washed with water, 10 percent by weight aqueous potassium bicarbonate solution, semi-saturated aqueous sodium chloride solution and saturated aqueous sodium chloride solution. After drying over sodium sulphate, the solution is evaporated in the cold under reduced pressure, finally at 0.05 mmHg. There is obtained 1-bromo-3,7,7-trimethyl-2-octene which is practically uniform according to thin-layer chromatography [$R_f$ 0.52; hexane/ethyl acetate (9:1 parts by volume)] and which is employed for the ether-formation without further purification.

EXAMPLE 21

0.26 g of 55 percent by weight sodium hydride dispersion in oil are washed three times with absolute tetrahydrofuran under nitrogen and subsequently covered over with 4 ml of absolute tetrahydrofuran. The mixture is then cooled to 0°C and, with stirring, a solution of 1.0 g of 1,4-benzodioxane-2-methyl alcohol in 10 ml of absolute tetrahydrofuran is added dropwise there to. The resulting mixture is stirred for 1 hour at room temperature and again cooled down to 0°C prior to the dropwise addition of a solution of 0.92 g of 1-bromo-3,7,7-trimethyl-octa-2,4-diene in 10 ml of absolute tetrahydrofuran. 10 ml of absolute hexamethyl phosphoric acid triamide are subsequently added and the mixture is stirred for 2 hours and allowed to warm slowly to room temperature. The mixture is then poured into 60 ml of ice-water and extracted three times with 50 ml of diethyl ether each time. The ether extracts are washed with water and saturated aqueous sodium chloride solution, dried over sodium sulphate and evaporated on a rotary evaporator. The oily residue is chromatographed on silica gel. Elution with hexane/diethyl ether (98:2 parts by volume) yields 2-[[(3,7,7-trimethyl-octa-2,4-dienyl)oxy]methyl]-1,4-benzodioxane of boiling point (bulb-tube distillation) 140°C/0.02 mmHg; $n_D^{20}$ = 1.5262.

EXAMPLE 22

0.57 g of sodium are dissolved in 10 ml of absolute alcohol under nitrogen and the solution is subsequently treated with 30 ml of absolute tetrahydrofuran. The mixture is treated, while stirring, with 11.8 g of the triphenyl phosphonium salt of cis, trans-ethyl-4-bromo-3-methyl-2-butenoate [J. Am. Chem. Soc. 93, 3457 [1971]]followed by 2.5 g of 3,3-dimethyl-butyraldehyde (U.S. Patent No. 2,481, 158; September 6, 1949; C. A. 44 P 2006e). The mixture is stirred for 1 hour at room temperature and then heated for a further 1 hour at reflux. The mixture is cooled, poured into ice-cold aqueous ammonium chloride solution and extracted three times with pentane. The extracts are washed with saturated sodium chloride solution, dried over sodium sulphate and evaporated on a rotary evaporator. The crude product is purified by distillation. There is obtained ethyl 3,7,7-trimethyl-octa-2,4-dienoate as an isomer mixture of boiling point (bulb-tube distillation 65°C/0.05 mmHg; $n_D^{20}$ − 1.4855.

EXAMPLE 23

A solution of 2.8 g of ethyl 3,7,7-trimethyl-octa-2,4-dienoate in 60 ml of absolute diethyl ether is treated slowly at 31°C with stirring and under a nitrogen atmosphere with a suspension of 0.50 g of lithium aluminum hydride in 30 ml of absolute diethyl ether. The temperature is allowed to rise to room temperature over the course of 2 hours and the mixture is subsequently decomposed in the cold by the dropwise addition of 40 ml of 10 percent ammonium chloride solution. The resulting mass is filtered through Cellit and the diethyl ether phase of the filtrate is separated. The aqueous phase is extracted with diethyl ether and the combined ether solutions are washed with saturated sodium chloride solution, dried over sodium sulphate and evaporated. There is obtained 3,7,7-trimethyl-octa-2,4-dien1-ol which is purified by distillation; boiling point (bulbtube distillation) 60°C/0.03 mmHg; $n_D^{20}$ = 1.4790.

EXAMPLE 24

A solution of 1.0 g of 3,7,7-trimethyl-octa-2,4-dien-1-ol in 10 ml of diethyl ether is treated dropwise at −20°C with 0.80 g of phosphorus tribromide. The temperature is allowed to rise to 0°C over the course of 30 minutes and the mixture is then poured into 20 ml of ice-water. The mixture is extracted three times with diethyl ether, the extracts are washed with water, 10 percent by weight aqueous potassium bicarbonate solution, semisaturated aqueous sodium chloride solution and saturated aqueous sodium chloride solution and then dried over sodium sulphate. After removal of the solvent under reduced pressure in the cold, there is obtained 1-bromo-3,7,7-trimethyl-octa-2,4-diene which shows a spot in the thin-layer chromatogram [$R_f$ = 0.63; hexane/ethyl acetate (4:1 parts by volume)] and which is employed for the ether-formation without further purification.

EXAMPLE 25

3.39 g 3,7,11-trimethyl-2-cis/trans, 4-cis/trans dodecadien-1-ol was dissolved in 20 ml of diethyl ether. To this solution at a temperature of 30°C 0.71 ml phosphorus tribromide was added dropwise. The reaction product was allowed to stand for ¾ of an hour at 30°C. and afterward was poured onto an icewater mixture and extracted with diethyl ether. The ether phase was dried and evaporated. The crude bromide was directly worked up by dissolving it in 10 ml of tetrahydrofuran.

To this solution there was added dropwise at 0°C the sodium salt of 2-hydroxymethyl1,4-benzodioxane at a temperature of 0°C. This salt was prepared by mixing 2.48 g of 2-hydroxymethyl-1,4-benzodioxane with 40 ml of hexamethylene phosphoric acid triamide and thereafter adding 0.8 g of a 50 percent by weight suspension of sodium in oil and allowing the mixture to stand under constant stirring for 2 hours at room temperature.

The mixture of the bromide and the sodium salt was allowed to further react for 4 hours at room temperature. After this the reaction mixture was poured onto an ice-water mixture and the reaction product was extracted from the water phase with diethyl ether. After drying and evaporating the ether phase one obtained by chromatography on Kieselgel the compound 2-[[(3,7,11-trimethyl-2,4-dodecadienyl)oxy]methyl]-1,4-benzodioxane as a colorless oil using hexane/diethyl ether (20:1 parts by volume). B.p. =178°C/0.035 mmHg (bulb tube distillation) $n_D^{23}$ = 1.5166.

EXAMPLE 26

By the procedure in example 25, 3,7,11-trimethyl-2-cis/trans, 4-cis/trans, 10-dodecatrien-1-ol was converted to 2-[[(3,7,11trimethyl-2,4,10-dodecatrienyl)oxy]methyl]-1,4-benzodioxane as a colorless oil B.p. 160°C/0.001 mmHg (bulb tube) $n_D^{23}$ = 1.5020.

EXAMPLE 27

7.45 g of sodium was dissolved in 160 ml of absolute ethyl alcohol. The solution was stirred at 0°C for 45 minutes and added to a mixture of 50 g of citronellal and 85 g of 1-carboethoxy-2-methyl-1-propenyl-diethylphosphonate in 480 ml of absolute ethyl alcohol. Thereafter the mixture was stirred at room temperature for 2 hours. The reaction mixture was then poured over ice and extracted with diethyl ether. The ether phase was washed neutral and dried and evaporated. The crude product was chromatographed on 3 kg of Kieselgel (elution medium 90 percent by volume hexane/10 percent by volume ethyl acetate. One obtained as a colorless oil, 3,7,11-trimethyl-2-cis/trans, 4-cis/trans, 10-dodecatrienoic acid ethyl ester B.p. = 97°–98°C/0.018 mmHg. 5.1 g. of 3,7,11-trimethyl-2-cis/trans,4-cis/trans, 10-dodecatrienoic acid ethyl ester was dissolved in 50 ml of benzene and 7.5 g sodium aluminum-bis (2-methoxyethoxy)-hydride ( 70 percent by weight suspension in benzene). After standing 1 hour at room temperature, water saturated with diethyl ether was added and then again water. After this, the reaction mixture was filtered and the crude oil was subjected to bubble tube distillation. One obtained 3,7,11-trimethyl-2-cis/trans, 4-cis/trans, 10-dodecatrien-1-ol B.p. = about 105°C/0.01 mmHg (bulb tube distillation), $n_D^{20}$ = 1.5024.

EXAMPLE 28

By the procedure given in example 27:
tetrahydrocitral and 1-carboethoxy-2-methyl-1-propenyl diethylphosphonate was reacted to produce 3,7,11-trimethyl-2-cis/trans, 4-cis/trans-dodecatrienoic acid ethyl ester (colorless oil B.p. = ~105°C/0.01 mmHg (bulb tube distillation) $n_D^{25}$ = 1.4824. This ethyl ester was converted by the procedure given in example 27 to 3,7,11-trimethyl-2-cis/trans, 4-cis/transdodecadien-1-ol B. p. = 130°C/0.02 mmHg (bulb tube) $n_D^{23}$ = 1.4880.

EXAMPLE 29

7.7 g Toluene-4-sulfonic acid -(3,7-dimethyl-7-hydroxyoctanyl) ester was dissolved in 10 ml of hexamethylène phosphoric acid tramide. To this solution there was added the sodium salt of 2-hydroxymethyl-1,4-benzodioxane at a temperature of 0°C. This salt was prepared by mixing 4.8 g 2-hydroxymethyl-1,4-benzodioxane with 60 ml of hexamethylene phosphoric acid triamide to which was added 1.3 g of a 50 percent by weight sodium hydride suspension in oil and the mixture was stirred for 2 hours at room temperature. The sodium salt and the ester were thoroughly reacted overnight. After this it was poured onto an ice-water mixture and the product was extracted from the water phase with diethyl ether. After drying and evaporating the ether phase the residue was chromatographed on Kieselgel with hexane/diethyl ether (4:1 parts by volume) to produce 2-[[(3,7-dimethyl-7-hydroxyoctanyl)oxy]methyl]-1,4-benzodioxane as a colorless oil B.p. = 0.5°C/0.04 mmHg (bulb tube) $n_D^{23}$ = 1.5084.

EXAMPLE 30

10.0 g 3,7-dimethyl-7-hydroxy-1-octanol was dissolved in 100 ml of pyridine. To the solution, there was added dropwise at temperature of 0°–5°C, 11.9 g toluene-4-sulfonic acid chloride dissolved in 30 ml of pyridine. The reaction mixture was stirred overnight at room temperature and the pyridine was removed by high vacuum. The residue was taken up in diethyl ether, then washed with 1 N aqueous hydrochloric acid and then with saturated aqueous sodium becarbonate and sodium chloride. After drying the ether was evaporated and one obtained toluene-4sulphonic acid-1(3,7-dimethyl-7-hydroxy octanyl) ester as a colorless oil $n_D^{23}$ = 1.4813.

EXAMPLE 31

1.2 g 2-[[(3,7-dimethyl-7-hydroxy-octanyl)oxy]methyl]-1,4-benzodioxane in 4.5 ml of hexamethylenephosphoric acid triamide was mixed with 2 ml hexamethylenephosphoric acid triamide containing 0.19 g of a 50 percent by weight suspension of sodium hydride in oil. The mixture was stirred at room temperature for 3 hours. Thereafter there was added to this mixture at 0°C a solution containing 0.7 g of propargylbromide dissolved in 2 ml of hexylmethylenephosphoric acid triamide. The reaction mixture was stirred at room temperature. The reaction mixture was further reacted by stirring overnight at room temperature. After this the reaction mixture was poured over a mixture of ice and water and the reaction product was extracted from the water phase with diethyl ether. After drying and evaporating the ether, one obtained 2-[[(3,7-dimethyl-7-propargyloxy-octanyl)oxy]methyl]-1,4-benzodioxane by chromatography on Kieselgel with hexane/diethyl ether (20:1 parts by weight). The reaction product was isolated as a colorless oil.

EXAMPLE 32

4.6 g 3,7-dimethyl-7-methoxy-octan-1-ol was dissolved in 20 ml of absolute diethyl ether. To the solution there was added at 0°C, 1 ml phosphorus tribromide. The reaction was stirred at room temperature for 1 hour. After this period, it was poured onto an ice-water mixture and extracted with diethyl ether. The ether phase was dried and evaporated. The crude bromide was worked up by dissolving it in 10 ml of hexamethylenephosphoric acid triamide and to the solution there was added the the sodium salt of 2-hydroxymethyl-1,4-benzodioxane. This sodium salt was prepared by the procedure set forth in example 25. The reaction mixture was then allowed to further react overnight. After this period, the mixture was poured over an ice-water mixture and the reaction product was extracted from the water phase with diethyl ether. After drying the ether phase, there was obtained 2[[(3-,7-trimethyl-7-methoxy-octanyl)oxy]methyl]-1,4-benzodioxane by chromatography on Kieselgel utilizing hexane/diethyl ether (20:1 parts by volume). The product was isolated as a colorless oil.

EXAMPLE 33

5.0 g of 3,7-dimethyl-7-methoxy-octan-1-al was dissolved in 40 ml of benzene. To this solution there was added dropwise, under constant stirring, 9.3 grams of sodiumaluminum-bis (2-methoxyethoxy) hydride (about 70 percent by weight mixture in benzene). After one hour at room temperature, the reaction was cooled to 0°C and additional water was added until the reaction ceased. Thereafter the reaction mixture was poured over anice-water mixture and extracted with diethyl ether. The ether phase was washed neutral, dried and evaporated. By bubble tube distillation of the remaining crude oil, one obtained 3,7-dimethyl-7-methoxy-octan-1-ol as a colorless oil. B.p. = 85/0.05 mmHg (bulb tube distillation); $n_D^{25}$ = 1.4463.

We claim:

1. A compound of the formula:

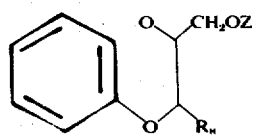

wherein $R_H$ is hydrogen or lower alkyl and Z is:

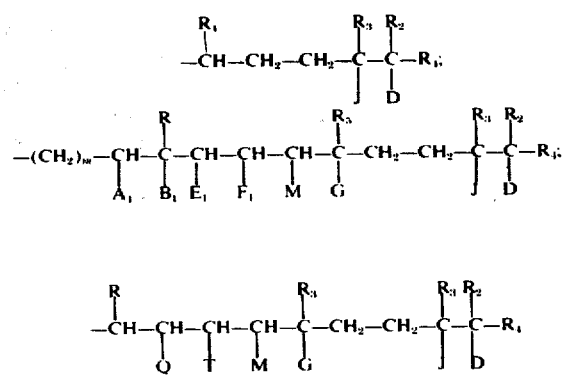

wherein R, $R_1$ and $R_3$ are hydrogen or lower alkyl; $R_2$, $R_4$ and $R_5$ are lower alkyl; D is hydrogen, lower alkyl, hydroxy, lower alkoxy, lower alkenyloxy, lower alkynyloxy or lower alkanoyloxy; J is hydrogen or taken together with D forms a carbon to carbon bond or an oxygen bridge; M, T and Q are individually hydrogen; G is individually hydrogen or lower alkoxy, with M taken together with G and Q taken together with T forming a carbon to carbon bond; $A_1$ and $B_1$ are individually hydrogen or taken together form a carbon to carbon bond; $E_1$ and $F_1$ are individually hydrogen or when $A_1$ and $B_1$ taken toether form a carbon to carbon bond, $E_1$ and $F_1$ are individually hydrogen, or taken together form a carbon to carbon bond and m is an integer from 1 to 2.

2. The compound of claim 1 wherein said compound has the formula

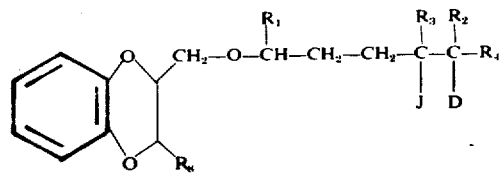

wherein $R_1$, $R_2$, $R_3$, $R_4$, $R_H$, J and D are as above.

3. The compound of claim 2 wherein said compound is 2-{[(1,5-dimethyl-4-hexenyl)oxy}methyl]-1,4-benzodioxane.

4. The compound of claim 1 wherein said compound has the formula

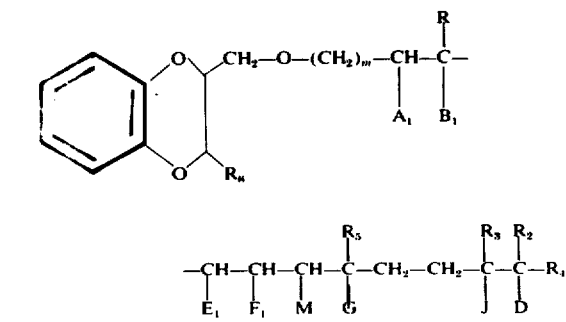

Wherein m, R, $R_2$, $R_3$, $R_4$, $R_5$, $A_1$, $B_1$, $E_1$, $F_1$, M. G, J and D are as above.

5. The compound of claim 4 wherein J and D form a carbon to carbon bond.

6. The compound of claim 5 wherein said compound is 2-{[(3,7,11-trimethyl-2,6,10-dodecatrienyl)oxy]-methyl}-1,4-benzodioxane.

7. The compound of claim 5 wherein said compound is 2-{[(3,7,11-trimethyl-2,4-dodecadienyl)oxy]methyl}-1,4-benzodioxane.

8. The compound of claim 5 wherein J and D form an oxygen bridge.

9. The compound of claim 8 wherein said compound is 2-{[(10,11-epoxy-3,7,11-trimethyl-2,6-dodecadienyl)oxy]methyl}-1,4-benzodioxane.

10. The compound of claim 8 wherein D is lower alkoxy.

11. The compound of claim 8 wherein said compound is 2-{[(3,7,11-trimethyl-11-methoxy-2,4-dodecadienyl)oxy]methyl}-1,4-benzodioxane.

* * * * *